Feb. 16, 1926.

C. H. BENNETT 1,573,759

COMBINED METAL HOOK AND LEVER

Filed July 21, 1925

Inventor
C. H. Bennett
By Marks & Clerk
Attys.

Patented Feb. 16, 1926.

1,573,759

UNITED STATES PATENT OFFICE.

CHARLES HENRY BENNETT, OF OAKHURST, BRISBANE, QUEENSLAND, AUSTRALIA.

COMBINED METAL HOOK AND LEVER.

Application filed July 21, 1925. Serial No. 45,139.

*To all whom it may concern:*

Be it known that I, CHARLES HENRY BENNETT, subject of the King of Great Britain, late of "Wynulla," Cunnamulla, but now of "Oakhurst," Enoggera Terrace, Paddington, Brisbane, both in the State of Queensland, Commonwealth of Australia, have invented new and useful Improvements in a Combined Metal Hook and Lever, of which the following is a specification.

Metal hooks are used for a great number of purposes but their usefulness has been impaired on account of their liability to become disengaged or to catch in other articles or gear. In some cases too it is difficult to engage the hook so that the adjacent ends of a rope or chain connected together thereby are held close enough together to prevent slackness.

The present invention has been devised to overcome the disabilities referred to above and is shaped so that the engaging end thereof forms a short second class lever that may be used for the purpose of drawing the two ends to be connected together, the eye of the hook forming the fulcrum of the lever. Its primary use is to facilitate the fixing of chain armour upon the tyres of motor vehicles to prevent skidding and it is particularly adapted for that purpose because the outward pressure of the connected ends of the chain upon the hook causes the engaging end to lie against or in very close proximity to the chain to which the eye is connected, but it can be used to advantage for many other purposes.

In the accompanying drawings—

Figure 2:
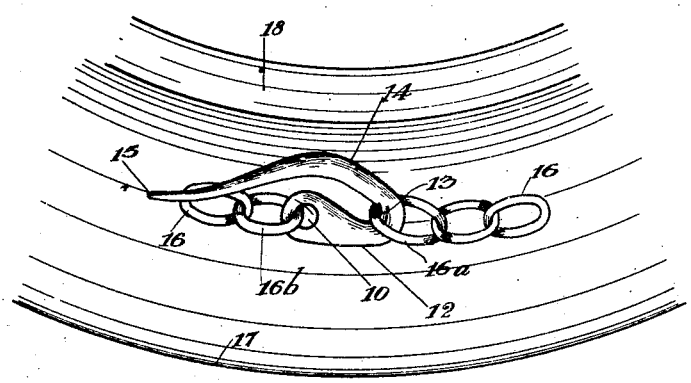
Fig. 2 is a perspective view of the hook applied as in Figure 1 but shown in its final secured position.

The hook includes a body which is formed from a single piece of metal having an enlarged terminal provided with an eye 10 by which it is permanently fixed to one end of a chain, rope or other article in the ordinary manner. A straight length of metal 12 projects from the eye for a suitable distance and is then bent backwardly and outwardly at 13 until it reaches a point 14 adjacent to the eye 10 where it is again bent slightly inwardly and from whence it continues onwardly to the termination 15 situated to the rear of the eye 10 at a distance approximately equal to the distance between the outer extremity of the eye 10ª and the outer extremity of the first bend in the metal that projects from the eye almost in a line with the straight metal portion 10. The main portion of the hook of course includes the portions 13 and 14 while the outer portion which continues from the hook constitutes a lever and it is to also be noted that the terminal of the lever when the parts are engaged as shown in Fig. 2 bears against the chain links so that the pressure of the terminal of the lever against the chain links is increased corresponding to the increase of power exerted on the chain.

Figure 1:
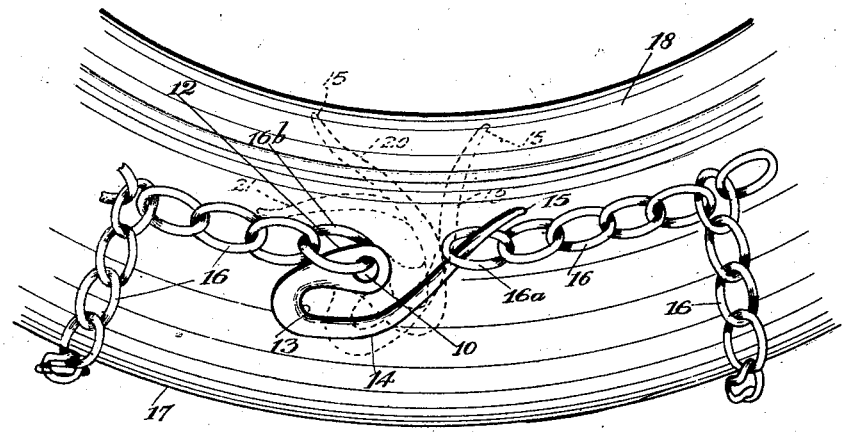
Fig. 1 is a perspective view of the hook applied to chain armour of a motor vehicle tyre, portion only of the chain armour, wheel and tyre being shown. The hook is shown in hard lines as it appears when the engaging end has just been inserted into the link at the end of the chain to be connected, the successive and final positions being indicated by dotted lines.

In its application the chain armour 16 is first placed in position upon the tyre 17 on the rim 18 of a wheel in the ordinary manner, the ends 16ª, 16ᵇ of the chain are pulled together and the extremity 15 is inserted in the link 16ª (Figure 1) until it can be gripped by the thumb and finger of the operator when it will be used as a lever, the eye 10 forming the fulcrum therefor, the successive positions being shown by dotted lines 19, 20 and 21, the latter being the final or fixed position.

In practical use when outward pressure is simultaneously exerted upon the eye 10 and the bend 13 the tendency is to force the extremity 15 of the hook against or in very close proximity to the portion of the chain to which the eye is fixed, thus making it almost impossible for anything to be accidently caught thereon.

The hook is also applicable to traces and other portions of horses' harness as well as for many other purposes.

I claim:—

A combined hook and lever for levering together two links of a chain or like fixing comprising a body formed from a single piece of metal including an enlarged terminal provided with an eye adapted for engagement with one of the links, a straight portion continuing therefrom, the body being bent backwardly and upwardly from the straight portion and lying substantially parallel with the enlarged eye to provide a hook adapted for engagement with the other link, and a lever portion continuing from the hook at a slight angle and terminating at a distance equal to the distance between the eye and the bend of the hook and in susbtantial alignment with the eye and the hook, substantially as and for the purposes set forth.

In testimony whereof, I have signed my name to this specification.

CHARLES HENRY BENNETT.